Oct. 19, 1943.  M. J. O. LOBELLE ET AL  2,332,155
RELEASABLE TOWING APPARATUS
Filed Sept. 21, 1942   3 Sheets-Sheet 1
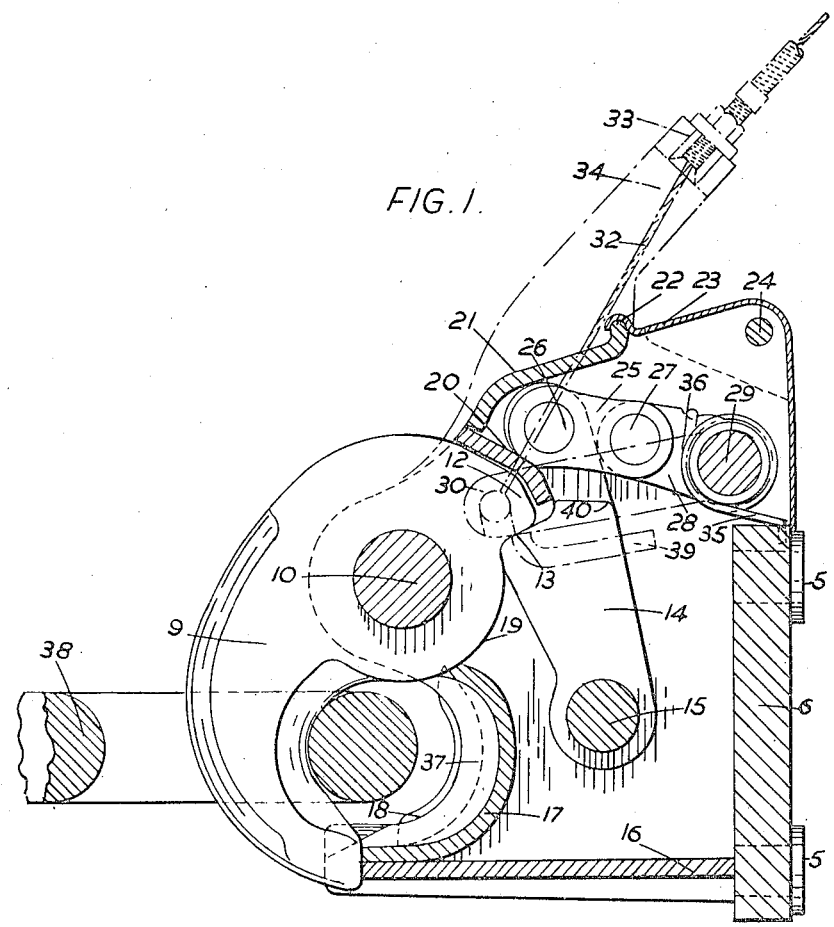
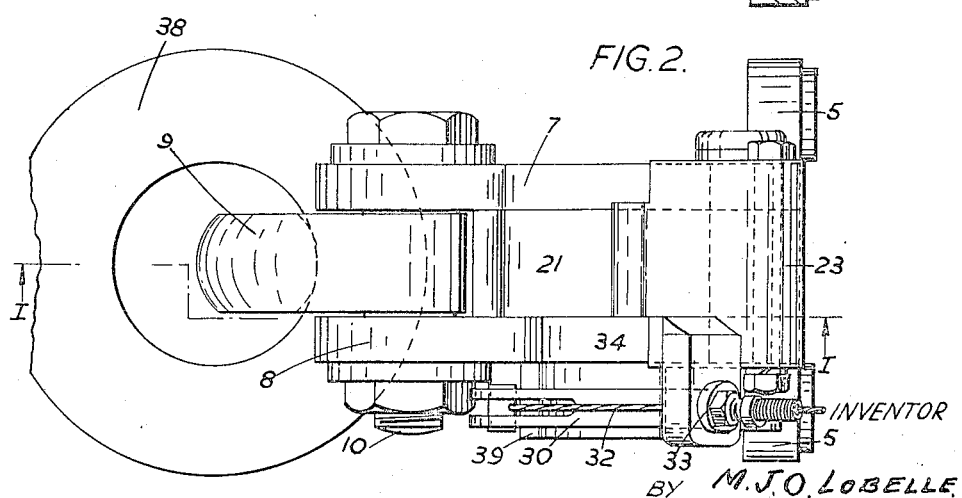
INVENTOR
BY M. J. O. LOBELLE
ATTORNEYS

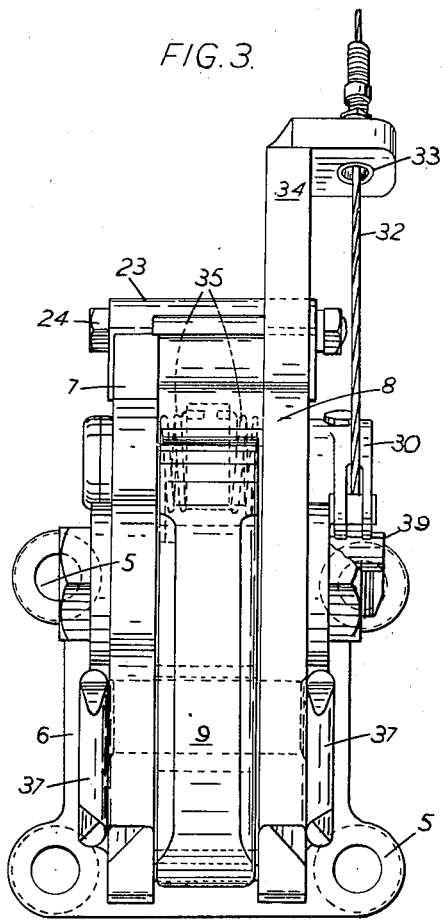

Oct. 19, 1943.  M. J. O. LOBELLE ET AL  2,332,155
RELEASABLE TOWING APPARATUS
Filed Sept. 21, 1942   3 Sheets-Sheet 3

INVENTOR
M.J.O. LOBELLE
BY
ATTORNEYS

Patented Oct. 19, 1943

2,332,155

UNITED STATES PATENT OFFICE 2,332,155

RELEASABLE TOWING APPARATUS

Marcel Jules Odilon Lobelle, Slough, England, assignor to R. Malcolm Limited, Slough, England, a British company Application September 21, 1942, Serial No. 459,198
In Great Britain April 18, 1942

4 Claims. (Cl. 280—33.15)

This invention relates to releasable towing apparatus whereby one vehicle may tow another and may release the connection immediately whenever required. The towing apparatus according to this invention has been designed for use between land vehicles but it will be obvious that it can also be used for towing purposes between navigable vessels or between planes in the air and for any like purpose in so far as similar considerations apply.

It is the principal object of the invention to provide a form of claw coupling which can be held locked by a toggle mechanism and released whenever required while the coupling is under strong pressure due to the load applied, the construction being such as to substantially exclude dirt, grit and so forth from the operating parts which might interfere with the reliable operation of the coupling and of the release mechanism. For this purpose the claw member is arranged to work closely between the side cheeks of a bracket carrying the claw, the space between these side cheeks being enclosed at all other parts as fully as possible.

The invention will be described with reference to the accompanying drawings which illustrate a preferred construction of the mechanism. In the drawings:

Figure 1 is a side elevation of the mechanism with one side cheek cut away on the line I—I of Figure 2 to show the parts behind it;

Figure 2 is a plan view of the mechanism shown in Figure 1, with the cover removed;

Figure 3 is a front view of the mechanism; and

Figure 4:
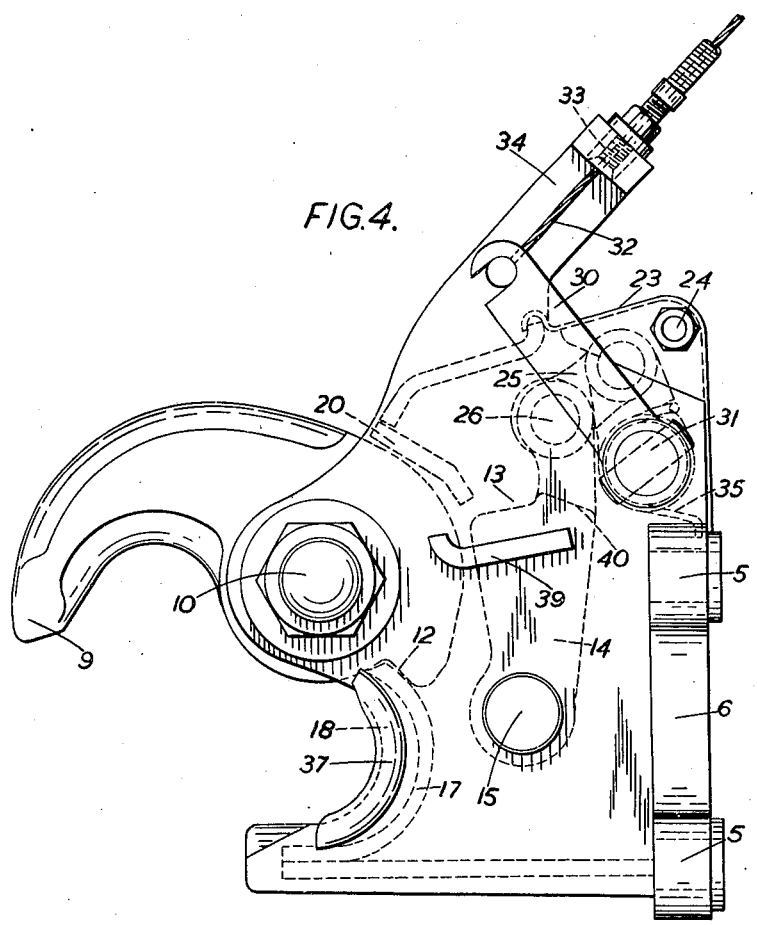
Figure 4 is a side view showing the claw opened.

In the construction illustrated in the drawings the bracket which holds the claw and its operating mechanism is built up by welding from cut-out plates of metal, but a bracket to serve the purpose could also be made by casting. Lugs 5 are provided on the base 6 of the bracket for securing it to the towing vehicle, and side cheeks 7 and 8 extend forwardly from the base to carry the moving parts. The claw 9 is carried by a substantial bolt 10 extending between the side cheeks, and on the side of its pivot opposite to that where the claw is formed is an abutment member 12 adapted to engage with a shoulder 13 on a locking lever 14 pivoted upon a stud 15 extending between the side cheeks.

The operating space between the side cheeks is enclosed by several shaped metal members welded between the two cheeks. At the bottom is a plate 16 and above this is a curved plate 17 extending from the front of the plate 16 back of a recess 18 in the side cheeks, until its upper end comes close to the rounded boss 19 of the claw member. Above the tailpiece of the claw is a plate 20 which co-operates with the rounded back of the claw to exclude the entry of dust, dirt and so forth at this point, while another plate 21 carries the closure up to the point 22 where the rear end of the plate is bent outwardly. From this point rearwardly the closure is effected by a shaped metal cap 23 whose forward end fits over the end 22 of the plate 21, the cap member being secured by a bolt 24 which is readily removable at any time to give access to the mechanism within.

The operating mechanism for the locking lever 14 consists of links 25 connected on the one hand by a floating pin 26 to the end of the locking lever and on the other hand by a floating pin 27 to a lever 28 mounted on a spindle 29 to which it is suitably keyed. Outside the bracket is a lever 30 secured by a pin 31 to the spindle 29 and engaged at its end by a cable 32 such as a Bowden type cable extending through a socket 33 in an arm 34 projecting outwardly from side cheek 8 of the bracket. Coiled springs 35 are mounted on the spindle 29 at either side of the lever 28, each with one end anchored in the base 6 of the bracket, as seen in Figure 1, and with the other end engaging in a notch at 36 in the lever 28. These springs normally keep the toggle, consisting of the members 25 and 28, extended with the centres of the members 26, 27 and 29 substantially in line between them. In order to facilitate dis-engagement, however, the axis of the floating pin 27 may be a little above a plane joining the axes of the pin 26 and spindle 29, as seen in Figure 1, the powerful springs 35 sufficing to hold the toggle extended in this position. 37 are strengthening pieces welded on at each side of the recess 18 where the link or towing member is received when the claw is closed. In Figures 1 and 2 a portion 38 of a circular link member is illustrated engaging with the claw 9. If the towed vehicle tends to overtake the towing vehicle this link comes against the attached strengthening pieces 37 which assist in taking the shock. The bent plate 39 welded on the side cheek 8 at the front acts as a stop for the lever 30 in its lowered position, as indicated in dotted lines in Figure 1.

In Figures 1 and 2 the claw 9 is seen in its engaging position, and it will be noted that it fits closely against the transverse plates 17 and 20, so preventing the ingress of dirt at these places.

As the claw opens towards the position seen in Figure 4 it will be noticed that it still makes close contact with the members 17 and 20, while the opening movement is stopped by the abutting of the tailpiece 12 of the claw against the back of the member 17.

The surfaces of the abutment 12 on the claw and of the shoulder 13 on the locking lever 14 are so shaped that no matter what load is applied to the claw by the towed vehicle, it is always possible to effect instant dis-engagement of the claw by pulling upon the cable 32 so as to draw up the lever 30, "break" the toggle 25, 28 and draw back the locking lever 14, as seen in Figure 4. The pull of the towed link 38 on the claw causes it to open as shown in this figure. When the pull on the cable is released the springs 35 tend to expand the toggle again and the front face of the locking lever 14 comes against the surface of the tailpiece of the claw but can move no further. With the parts in this position the claw remains raised, as in Figure 4, but when the link 38 of a towed vehicle is brought into the recess 18 beneath the claw, the claw can be engaged at once by pushing it down by hand until the abutment 12 on the tailpiece of the claw snaps over the shoulder 13 on the locking lever 14, whereupon the springs 35 extend the toggle again to the position shown in Figure 1, and the claw is held locked by engagement between the surfaces at 12 and 13.

The details of construction of the mechanism can of course be altered without departing from the scope of the invention, but the construction illustrated has proved successful in tests and is believed to comply with all requirements. The claw mechanism can be mounted in any position, either as shown or on its side or inverted in position. In all positions of the parts the entry of dust and dirt to the operating mechanism is effectively prevented by the enclosure of the space between the side cheeks in which the claw works. The part of the claw lying between the side cheeks occupies the full width of the space between except for the necessary working clearance, and the locking lever 14 also occupies the full space up to the shoulder marked 40 in Figures 1 and 4, above which the lever is reduced in width to accommodate the links 25 at each side of its upward projection.

I claim:

1. A releasable towing apparatus comprising a bracket with side cheeks, a claw member and means for pivotally supporting it between said side cheeks, the part of the claw member which operates between said side cheeks being adapted to work closely between the inside faces of said side cheeks, a locking lever and means pivotally supporting it between said side cheeks, said claw member and locking lever being formed with co-acting abutment faces adapted to lock the claw member in its engaging position, a toggle mechanism adapted when extended to hold said locking lever in the engaging position, spring means adapted normally to hold the toggle mechanism extended, operating means adapted to turn a member of the toggle mechanism for releasing purposes, and enclosing members adapted to close the gap between said side cheeks except at the place where said claw member projects, and to co-operate with said claw member in substantially preventing the entry of dirt and grit to the operating mechanism between said side cheeks.

2. A releasable towing apparatus as claimed by claim 1, wherein the abutment face on the claw member is formed on a tail-piece of said claw member, and the abutment face on said locking lever is on a shoulder thereof such that the pressure on the shoulder acts in compression upon the part of said locking lever between said shoulder and the pivotal support for said locking lever, while the abutment faces are so shaped that the locking lever can be turned to release said claw member while it is under load.

3. A releasable towing apparatus as claimed by claim 1, wherein the said bracket and side cheeks are formed as a welded structure, and the operating space between said side cheeks is enclosed, except for the space at which said claw member works, partly by shaped metal members welded between said side cheeks, and partly by a removable cover for giving access to said operating mechanism when required.

4. A releasable towing apparatus as claimed by claim 1, wherein the claw member extends from its pivotal support in its engaging position downwardly around a recess in said side cheeks, while the locking lever extends upwardly from its pivotal support and is shouldered to provide the abutment face for co-operating with the abutment on the tailpiece of said claw member, the end of said locking lever being extended to engage with an element of said toggle mechanism between said side cheeks.

MARCEL JULES ODILON LOBELLE.